(12) United States Patent
Christensen et al.

(10) Patent No.: US 6,636,248 B1
(45) Date of Patent: *Oct. 21, 2003

(54) METHOD AND SYSTEM FOR VISUALLY DELINEATING A RELATIONSHIP BETWEEN RELATED GRAPHICAL WINDOWS IN A GRAPHICAL USER INTERFACE

(75) Inventors: Catherine Christensen, San Jose, CA (US); Ricardo L. Gonzalez, Huron, CA (US); David Brooks Hamilton, Milpitas, CA (US); Daina Edvina Pupons Wickham, San Jose, CA (US); Chi K. Yeung, Mountain View, CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/387,795

(22) Filed: Sep. 1, 1999

(51) Int. Cl.$^7$ ................................. G06F 3/14
(52) U.S. Cl. ................ 345/835; 345/837; 345/839; 345/781; 345/794
(58) Field of Search ................... 345/835, 837, 345/839, 840, 737, 768, 779, 778, 804, 805, 853, 851, 781, 794

(56) References Cited

U.S. PATENT DOCUMENTS

| | | | | |
|---|---|---|---|---|
| 5,050,105 A | * | 9/1991 | Peters | 345/119 |
| 5,226,117 A | * | 7/1993 | Miklos | 345/356 |
| 5,261,044 A | * | 11/1993 | Dev et al. | 345/357 |
| 5,515,488 A | | 5/1996 | Hoppe et al. | 395/140 |
| 5,651,107 A | * | 7/1997 | Frank et al. | 395/344 |
| 5,740,440 A | | 4/1998 | West | 395/704 |
| 5,751,287 A | | 5/1998 | Hahn et al. | 345/351 |
| 5,758,122 A | | 5/1998 | Corda et al. | 395/500 |
| 5,765,176 A | | 6/1998 | Bloomberg | 707/514 |
| 5,794,178 A | | 8/1998 | Caid et al. | 704/9 |
| 5,933,143 A | * | 8/1999 | Kobayashi | 345/346 |
| 6,020,888 A | * | 2/2000 | Ho | 345/348 |
| 6,112,015 A | * | 8/2000 | Planas et al. | 395/200.53 |
| 6,184,881 B1 | * | 2/2001 | Medl | 345/764 |
| 6,225,997 B1 | * | 5/2001 | Mitsuoka et al. | 345/348 |
| 6,421,070 B1 | * | 7/2002 | Ramos et al. | 345/763 |

* cited by examiner

*Primary Examiner*—Kristine Kincaid
*Assistant Examiner*—Thomas T. Nguyen
(74) *Attorney, Agent, or Firm*—Lacasse & Associates, LLC; Randy W. Lacasse; Ingrid Foerster, Esq.

(57) ABSTRACT

An initial icon is displayed as a watermark throughout related windows to represent a relationship to a particular application. As a user traverses related windows belonging to the same family, the initial icon, displayed as a watermark, is persistent throughout each of the related windows and is displayed in an area maximizing visibility, e.g. on the outer perimeter of the window workspace to maximize the likelihood of being seen when multiple windows overlap.

22 Claims, 4 Drawing Sheets

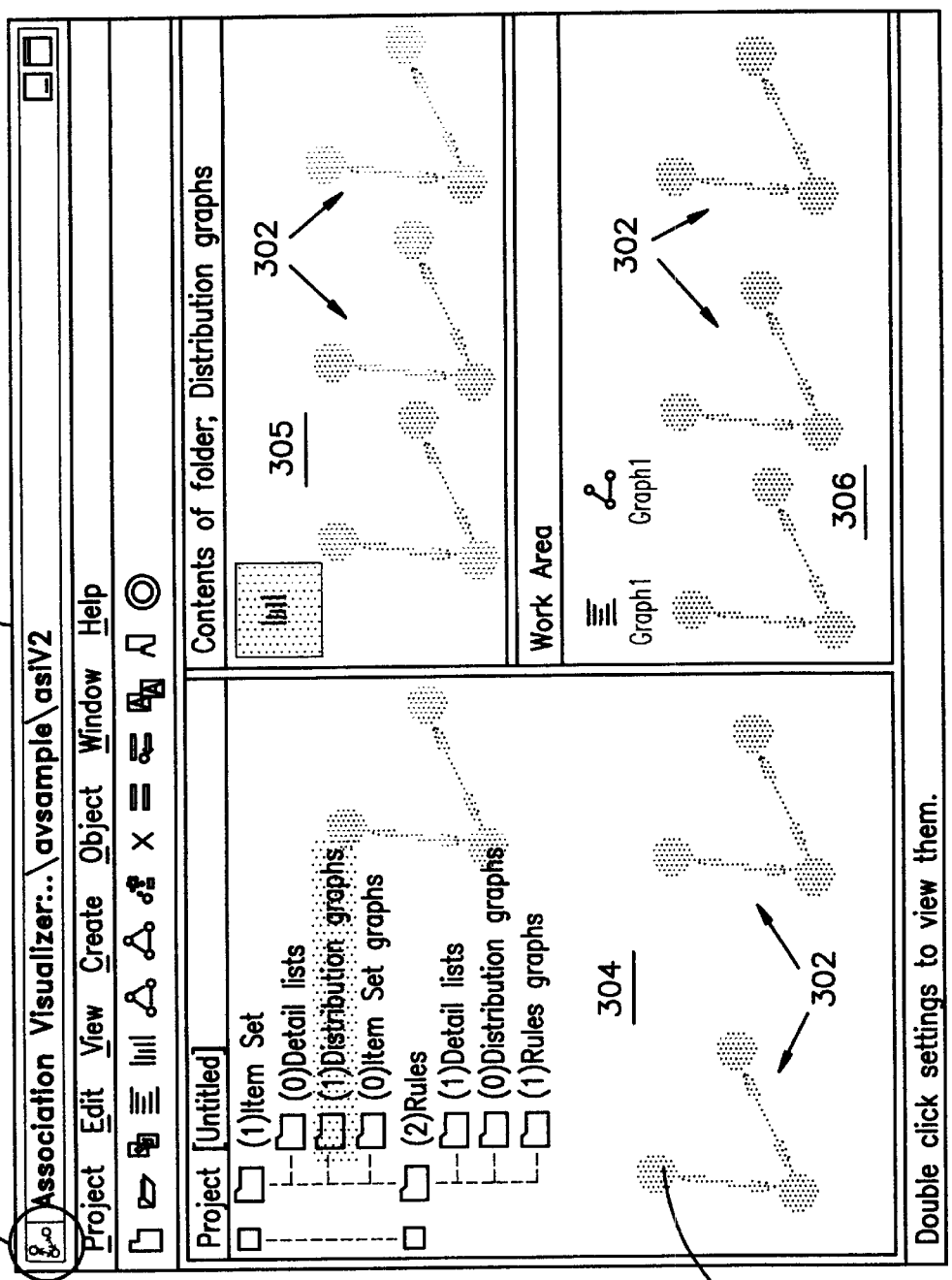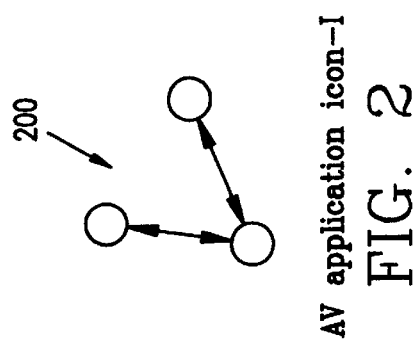

AV application icon – II

METHOD AND SYSTEM FOR VISUALLY DELINEATING A RELATIONSHIP BETWEEN RELATED GRAPHICAL WINDOWS IN A GRAPHICAL USER INTERFACE

RELATED MATERIALS

This application is related to the following commonly owned applications which are hereby incorporated by reference:

Color & Symbol Coded Visual Cue for Relating Screen Menu to Executed Process, U.S. application Ser. No. 08/954,852, filed Oct. 21, 1997.

BACKGROUND OF THE INVENTION

1. Field of Invention

The present invention relates generally to the field of graphical user interfaces. More specifically, the present invention relates to using persistent graphical watermarks throughout interrelated graphical user interfaces.

2. Discussion of Prior Art

The prior art is replete with examples of using icons in various schemes to present visual information related to a particular object. Many applications contain visual indicators that relate icons for existing objects of a particular type to an icon for creating new objects of that type. An example would be a Microsoft Excel® icon used as a representation of a specific spreadsheet developed using Excel. This metaphor, however, is not carried any further than this; specifically, it is not carried into related graphical user interfaces or user assistance programs (e.g. wizards). Once a spreadsheet represented by the icon is opened, the icon itself is not well represented in the workspace. When the user has multiple spreadsheets open, in addition to other unrelated windows, no recognition of the originating application program is possible. In addition, when multiple partially overlapping windows are open, no immediate recognition of the originating application program for a partially hidden window is provided for Watermarked documents have been known for some time. Paper, such as bond stock, traditionally has a graphical marking which is slightly visible unless held up to the light. U.S. currency also has similar discrete characteristics represented by various recognizable and persistent images.

Electronic watermarking has also existed for some time in the prior art. Typical implementations include electronic signatures displayed/hidden within displayable images and recognized as a pattern of image pixels. In addition, world wide web pages and other graphical windows often include an electronic version of the above described paper watermark (one or more images are displayed within the window as a background image, i.e., a faded version of the original).

What the prior art has failed to teach, however, is a method of using persistent watermarks throughout interfaces belonging to a single family or related family of applications.

The patent to Bloomberg (U.S. Pat. No. 5,765,176), assigned to Xerox Corporation, provides for Performing Document Image Management Tasks Using an Iconic Image Slaving Embedded Encoded Information. Iconic versions of pages or sections of text are used to organize, in reduced size, a plurality of embedded text objects. Bloomberg further describe general methods of using color and watermarking. Bloomberg, however, discusses watermarking as a way to ensure data integrity, not to provide visual cues as to related family or interface objects.

The patent to Hoppe et al. (U.S. Pat. No. 5,515,488), assigned to Xerox Corporation, provides for a Method and Apparatus for Concurrent Graphical Visualization of a Database Search and its Search History. A graphical representation of a query to a database enables creation and traversal of the search history. Relationships between objects are noted graphically. The reference, however, appears to be focused on nesting techniques.

The patent to West (U.S. Pat. No. 5,740,440), assigned to Objective Software Technology, provides for a Dynamic Object Visualization and Browsing System. An animated graphical display reflects the status of selected objects and their interrelationships.

The patent to Hahn et al. (U.S. Pat. No. 5,751,287), assigned to Documagix, Inc., provides for a System for Organizing Document Icons with Suggestions, Folders, Drawers, and Cabinets. Each drawer can be marked with a graphic icon for easier visual identification. The drawer, and associated text can also be colored. Folders can similarly be named, described and keyed with a color. The patent to Corda et al. (U.S. Pat. No. 5,758,122), assigned to The United State of America, provides for an Immersive Visual Programming System. During execution of a compiler, the flow of data objects and the interaction among the data objects is visually displayed to the user. Objects may retain some color aspects.

The patent to Caid et al. (U.S. Pat. No. 5,794,178), assigned to HNC Software, Inc., provides for a Visualization of Information Using Graphical Representations of Context Vector Based Relationships and Attributes. Caid discloses visualization of textual information by translating context vectors into visual and graphical representations. General teachings are provided to 3D icons with a specific shape, size, color, texture and movement.

Whatever the precise merits, features ad advantages of the above cited references, none of them achieves or fulfills the purposes of the present invention as described in the detailed description that follows; specifically the prior art fails to replicate displayable electronic watermarks within related graphical user interfaces.

SUMMARY OF THE INVENTION

The present invention provides an-initial icon which is displayed as a watermark throughout related windows to represent a relationship to a particular application. As a user traverses related windows belonging to the same family, the initial icon, displayed as a watermark, is persistent throughout each of the related windows and is displayed in an area maximizing visibility, e.g. on the outer perimeter of the window workspace to maximize the likelihood of being seen when multiple windows overlap.

In a preferred embodiment data mining application, a plurality of differing "association visualizers" are developed. An association visualizer defines the visual attributes that will characterize a particular application's data set. A data set, upon being displayed, will be modified visually depending on which associations visualizer was chosen. To distinguish a window which is related to the original associations visualizer, the present invention provides for a persistent graphical watermark which is displayed within the workspace of the visible window. In addition, the size, frequency of replication, location and coloring will, in some embodiments, vary with window size, location, workspace size, screen size, resolution, etc.

BRIEF DESCRIPTION OF THE DRAWINGS

FIG. 2 illustrates an example of a first associations visualizer icon.

FIG. 3 illustrates an associations visualizer graphical user interface including the icon of FIG. 2 in the title bar and as a watermark in the various workspaces.

DESCRIPTION OF THE PREFERRED EMBODIMENTS

Figure 1:
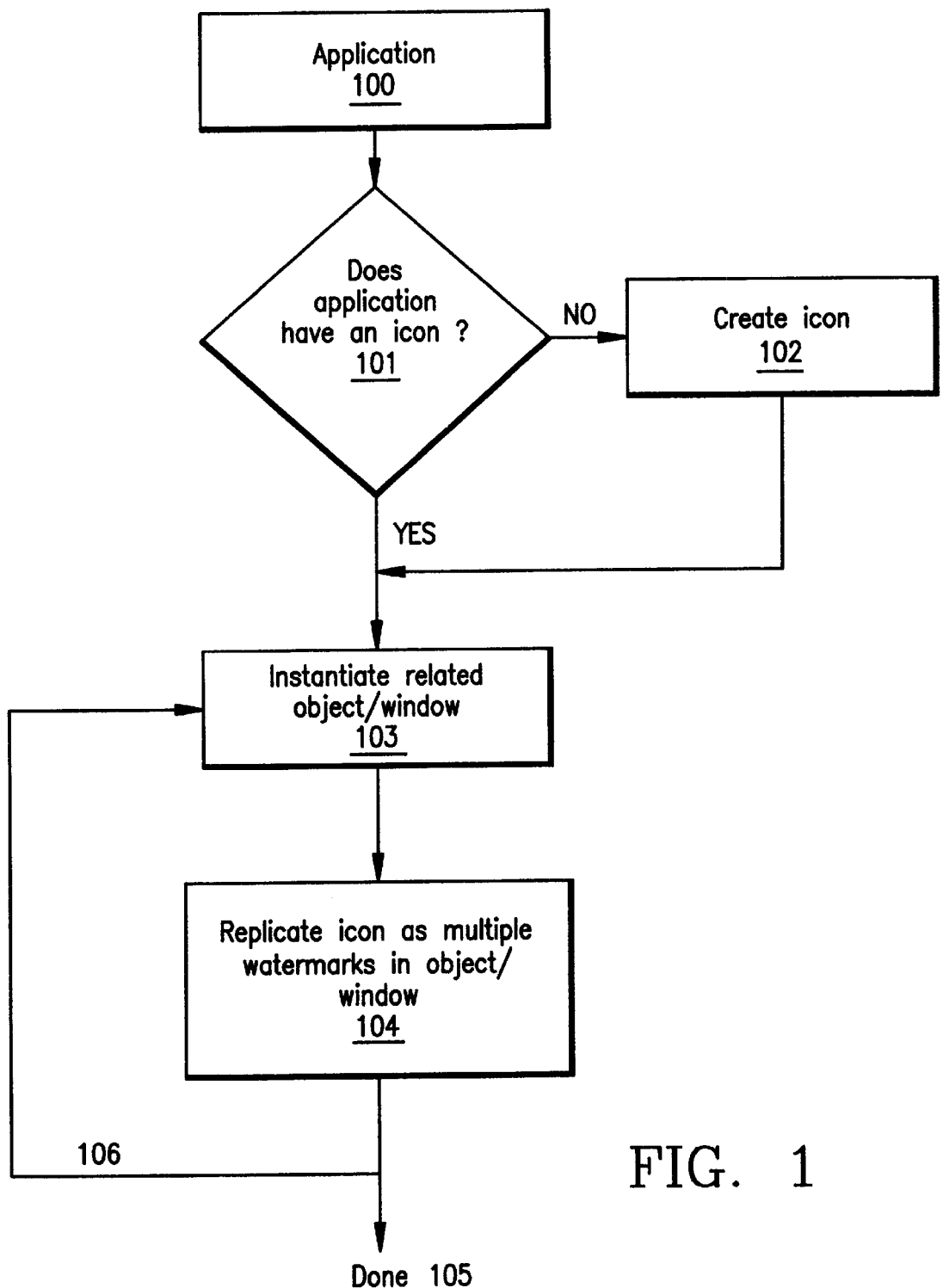
FIG. 1 illustrates a flowchart illustrating the basic sequence of steps to watermarking related graphical user interfaces.

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as a exemplification of the principles of the invention and the associated functional specifications of the materials for its construction and is not intended to limit the invention to the embodiment illustrated. Those skilled in the art will envision many other possible variations within the scope of the present invention.

FIG. 1 illustrates a flowchart illustrating the basic sequence of steps to watermark related graphical user interfaces. A specific application, program 100 typically has associated with it an iconic representation to be displayed on a desktop, menu bar, title bar, etc. If an icon has not already been created, then an icon is created at step 102 using known graphical techniques.

Figure 4:
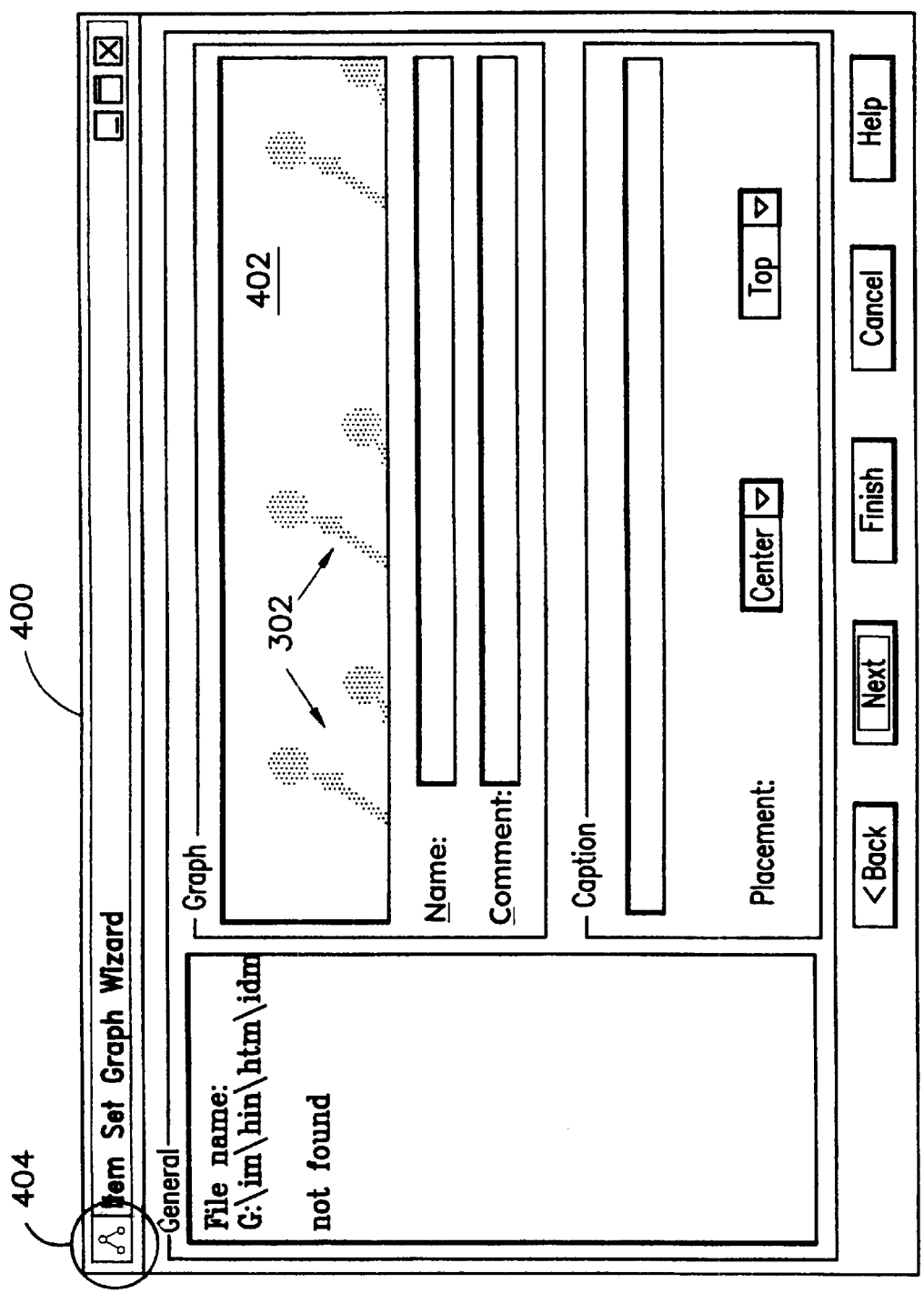
FIG. 4 illustrates a graphical user interface related to the FIG. 3 associations visualizer.
Figure 6:
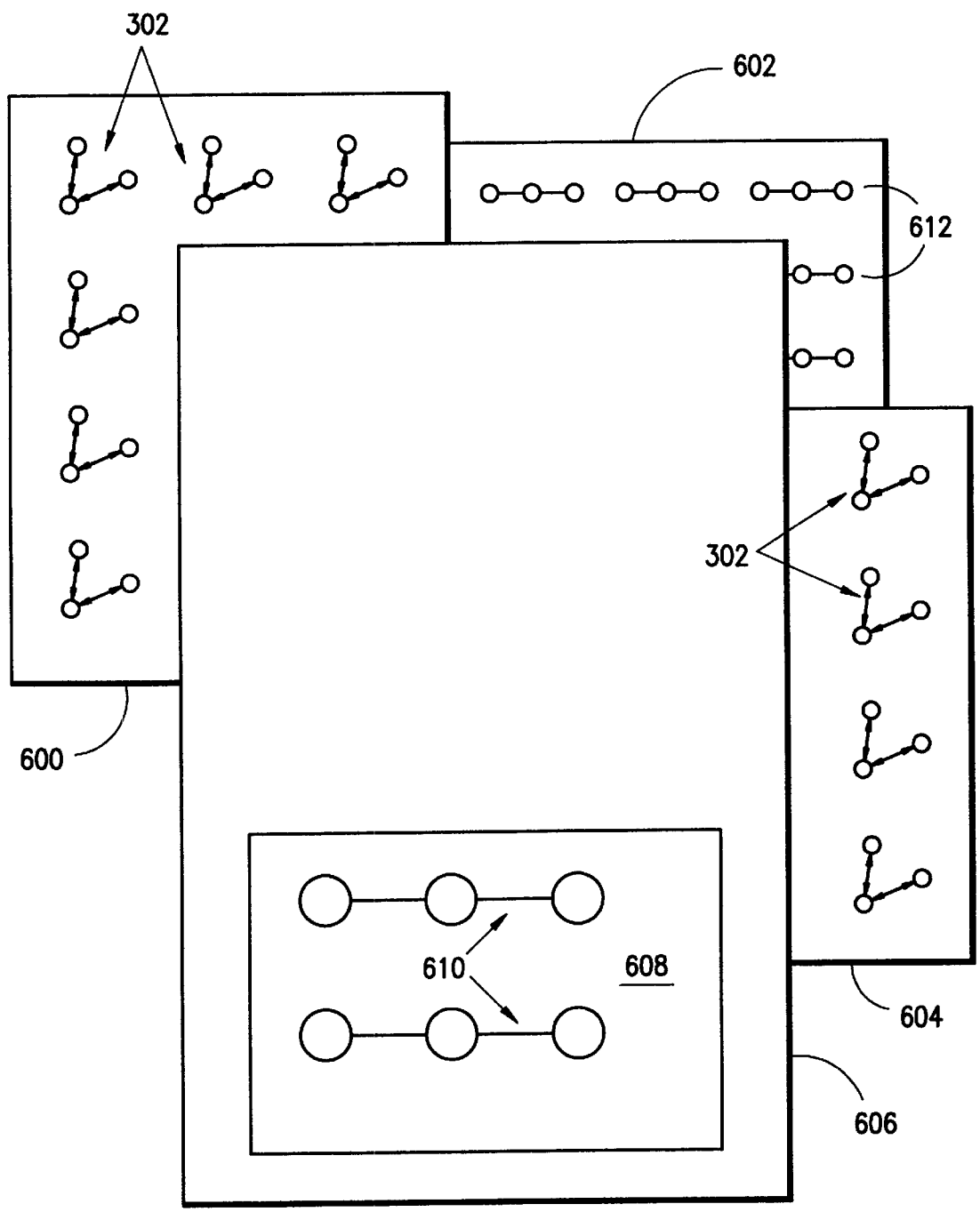
FIG. 6 illustrates a display with overlapping multiple windows; windows related to each of said first and second associations visualizers are illustrated.

To provide a visual cue to a user having related applications instantiated upon an electronic display 103, a watermark replication of the original application icon is provided throughout the visible workspace of related windows 104. The present invention replicates the original icon as a watermark, i.e. a faded, background image as shown in FIGS. 3, 4 and 6. If additional related windows are opened 106 then they also receive the replicated watermarks.

The placement, size and frequency of replication is related to the available visible space on an occluded window. If only a small space is visible, enough of the watermark needs to be visible to enable one to recognize the similarity to the original application icon. If the visible space is large, the watermark will typically be large. Overlapped windows retain the watermarks as close to the outside perimeter as possible to increase the probability of being seen.

FIG. 2 illustrates an example of a first associations visualizer icon 200. The icon's specific graphical content, coloring or shape is not important to the replication process. The watermark created will, in a first embodiment, be a light gray replication as shown by element 302 as shown in FIG. 3. FIG. 3 illustrates an associations visualizer graphical user interface 300 including the icon of FIG. 2 (200) in the title bar and as a watermark 302 in the various workspaces 304, 305, and 306.

FIG. 4 illustrates a graphical user interface related to the FIG. 3 associations visualizer. In the prior art, even though this graphical interface is related to the parent associations visualizer, no immediate visual recognition of this relationship is noted to the user. The icon 404 in the title bar is not the same icon as it is directed to the item set graph wizard window. The present invention, however, replicates one or more complete or partial facsimiles of the associations visualizer icon of the association visualizer application originally chosen. The replicated icon is displayed as a series of watermarks 302 in workspace 402. Upon viewing the graphical user interface of FIG. 4, the user should be able to immediately discern the relationship.

Figure 5:
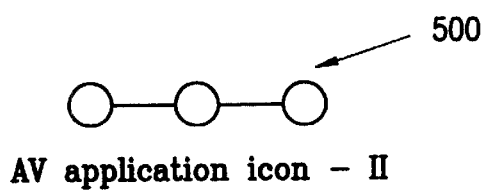
FIG. 5 illustrates a second associations visualizer icon.

FIG. 5. illustrates a second associations visualizer icon 500 which is related to a separate associations visualizer. Related graphical user interfaces/windows would retain replicated facsimiles of the watermark as shown in window 606 of FIG. 6.

FIG. 6 illustrates a display with overlapping multiple windows 600, 602, 604, and 606. Windows related to each of said first and second associations visualizers are illustrated. Windows 600 and 604 would be immediately recognized as related to the associations visualizer of FIGS. 2 and 3 by the replicated watermarks 302. Windows 602 and 606 would be immediately recognized as related to the associations visualizer of FIG. 5 by the replicated watermarks 610 and 612. The watermark icons shown are replicated in size and number to enable recognition, even if located within a small visible section of an overlapped window such as shown in window 602. Large areas have large watermarks as shown with elements 610.

While graphical user interfaces 300, 400, and 606 illustrate the watermarks as visible in the applicable work space windows, the present invention encompasses the replication of watermarks at any visible location within an opened window. In addition, while all of the watermarks are illustrated as light grey background images, faded or light color versions are envisioned and would not depart from the scope of the present invention.

The above enhancements for graphical watermarks and its described functional elements are implemented in various computing environments. For example, the present invention may be implemented on a conventional IBM PC or equivalent, multi-nodal system (e.g. LAN) or networking system (e.g. Internet, WWW). All programming, GUIs, display panels, watermarks, dialog box templates, and data related thereto are stored in computer memory, static or dynamic, and may be retrieved by the user in any of: conventional computer storage, display (i.e. CRT) and/or hardcopy (i.e. printed) formats. The programming of the present invention may be implemented by one of skill in the art of graphics or object-oriented programming.

CONCLUSION

A system and method has been shown in the above embodiments for the effective implementation of a persistent watermarked iconic visual cue for relating various objects within the same application family. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, computing environment, specific computing hardware and specific iconic color or symbol schemes. In addition, the specific chosen icons are representative of the preferred embodiment and should not limit the scope of the invention. Various icons and color schemes can be selected to be persistent throughout any related GUIs.

What is claimed is:

1. A computer-based method of visually delineating a relationship between related graphical windows in a graphical user interface, the method comprising:

associating an icon with multiple, related graphical windows;

displaying at least one watermark replica of said icon in a visible area of each related graphical window that is displayed;

wherein said displayed graphical windows are recognizable as related by the persistence of said watermark; and wherein said watermark provides user assistance when traversing a series of graphical templates.

2. A computer-based method of visually delineating a relationship between related graphical windows, as per claim 1, wherein said watermark is sized to fit substantially within said visible area.

3. A computer-based method of visually delineating a relationship between related graphical windows, as per claim 1, wherein said displayed graphical windows are visually overlapped within a single electronic display space.

4. A computer-based method of visually delineating a relationship between related graphical windows, as per claim 1, wherein said multiple graphical windows are located located locally or across networks.

5. A computer-based method of delineating a relationship between graphical windows related to an application program comprising:

associating an icon with said application program;

creating, in computer storage, a watermark of said icon;

displaying a first graphical window related to said application program;

displaying a second graphical window related to said application program;

displaying at least one replica of said watermark within a visible area of said first graphical window;

displaying at least one replica of said watermark within a visible area of said second graphical window, wherein said first and second graphical windows are recognizable as related to said application program by the persistence of said replicas; and wherein said watermark provides user assistance when traversing a series of graphical windows.

6. A computer-based method of delineating a relationship between related graphical windows, as per claim 5, wherein a plurality of said replicas are sized to fit substantially within the visible areas of said first and second windows.

7. A computer-based method of delineating a relationship between related graphical windows, as per claim 5, wherein said first and second graphical windows are overlapped within a single electronic display space.

8. A computer-based method of delineating a relationship between related graphical windows, as per claim 5, wherein said replicas provide user assistance when traversing a series of graphical templates.

9. A computer-based method of delineating a relationship between related graphical windows, as per claim 5, wherein said first and second graphical windows are located locally or across networks.

10. A computer program product for use with a graphics display device, said computer program product comprising:

a computer usable medium having computer readable program code means included in said medium:

said computer readable program code means embodying a method for associating an icon with an application program;

creating a watermark of said icon;

displaying a first graphical window related to said application program;

displaying a second object graphical window related to said application program;

displaying at least one replica of said watermark within a visible area of said first graphical window;

displaying at least one replica of said watermark within a visible area of said second graphical window, wherein said first and second graphical windows are recognizable as related to said application program by the persistence of said replicas; and wherein said watermark provides user assistance when traversing a series of graphical windows.

11. A computer program product for use with a graphics display device, as per claim 10, wherein a plurality of said replicas are sized to fit substantially within the visible areas of said first and second windows.

12. A computer program product for use with a graphics display device, as per claim 10, wherein said first and second graphical windows are overlapped within a single electronic display space.

13. A computer program product for use with a graphics display device, as per claim 10, wherein said replicas provide user assistance when traversing a series of graphical templates.

14. A computer program product for use with a graphics display device, as per claim 10, wherein said first and second graphical windows are located locally or across networks.

15. A computer-based system delineating a relationship between graphical windows related to an application program comprising:

an icon associated with said application program;

a watermark of said icon;

a first graphical window related to said application program;

a second graphical windows related to said application program;

wherein at least one replica of said watermark is displayed within a visible area of said first graphical window;

wherein at least one replica of said watermark is displayed within a visible area of said second graphical window, wherein said first and second graphical windows are recognizable as related to said application program by the persistence of said replicas; and wherein said watermark provides user assistance when traversing a series of graphical windows.

16. A computer-based system delineating a relationship between graphical windows related to an application program, as per claim 15, wherein a plurality of said replicas are sized to fit substantially within the visible areas of said first and second graphical windows.

17. A computer-based system delineating a relationship between graphical windows related to an application program, as per claim 15, wherein said first and second graphical windows are located locally or across networks.

18. A computer program product for use with a graphics display device, said computer program product comprising:

a computer usable medium having computer readable program code means included in said medium:

said computer readable program code means embodying a method for associating an icon with multiple, related graphical windows;

displaying at least one watermark replica of said icon in a visible area of each related graphical window that is displayed;

wherein said displayed graphical windows are recognizable as related by the persistence of said icon; and wherein said watermark provides user assistance when traversing a series of graphical templates.

19. A computer program product for use with a graphics display device, as per claim 18, wherein said watermark is sized to fit substantially within the visible area.

20. A computer program product for use with a graphics display device, as per claim 18, wherein said displayed graphical windows are visually overlapped within a single electronic display space.

21. A computer program product for use with a graphics display device, as per claim 18, wherein said multiple graphical windows are located locally or across networks.

22. A computer-based system delineating a relationship between related graphical windows in a graphical user interface comprising:

an icon associated with multiple, related graphical windows;

at least one watermark replica of said icon displayed in a visible area of each related graphical window that is displayed;

wherein said displayed graphical windows are recognizable as related by the persistence of said icon; and wherein said watermark provides user assistance when traversing a series of graphical templates locally or across networks.

\* \* \* \* \*